United States Patent [19]

Holtz

[11] Patent Number: 4,526,399

[45] Date of Patent: Jul. 2, 1985

[54] CART SUPPORT FOR A COMPUTER PRINTOUT

[76] Inventor: Gilbert J. Holtz, 182 Tibbetts Rd., Yonkers, N.Y. 10705

[21] Appl. No.: 567,698

[22] Filed: Jan. 3, 1984

[51] Int. Cl.³ ............................................. B62B 1/26
[52] U.S. Cl. ................................ 280/655; 280/47.19; 280/47.29; 280/47.37 R
[58] Field of Search .................. 280/652, 655, 47.17, 280/47.18, 47.19, 47.27, 47.28, 47.29, 47.35, 47.37 R

[56] References Cited

U.S. PATENT DOCUMENTS

| D. 180,868 | 8/1957 | Diehl | 280/47.19 X |
|---|---|---|---|
| 2,901,262 | 8/1959 | Berlin | 280/47.35 X |
| 3,052,484 | 9/1962 | Huffman et al. | 280/47.35 X |
| 4,062,565 | 12/1977 | Holtz | 280/47.37 R X |
| 4,185,848 | 1/1980 | Holtz | 280/47.37 R X |
| 4,355,818 | 10/1982 | Watts | 280/47.19 X |

Primary Examiner—Joseph F. Peters, Jr.
Assistant Examiner—Michael Mar
Attorney, Agent, or Firm—Bauer & Amer

[57] ABSTRACT

A cart of the type similar to that used for carrying luggage at airports or the like which, in its unfolded condition, provides two laterally extending support shelves; one for a supply length of blank paper, and one for the paper after it has been imprinted upon and made into a computer printout. The cart is constructed to unfold from a compact storage condition into a two-shelf support, as and for the purposes just noted, wherein the upper shelf on an upper body frame snaps into place onto a lower frame component in assuming its laterally extending position, and this engagement effectively holds the two frames in extending relation to each other as well as forms a pushing handle for the cart.

2 Claims, 6 Drawing Figures

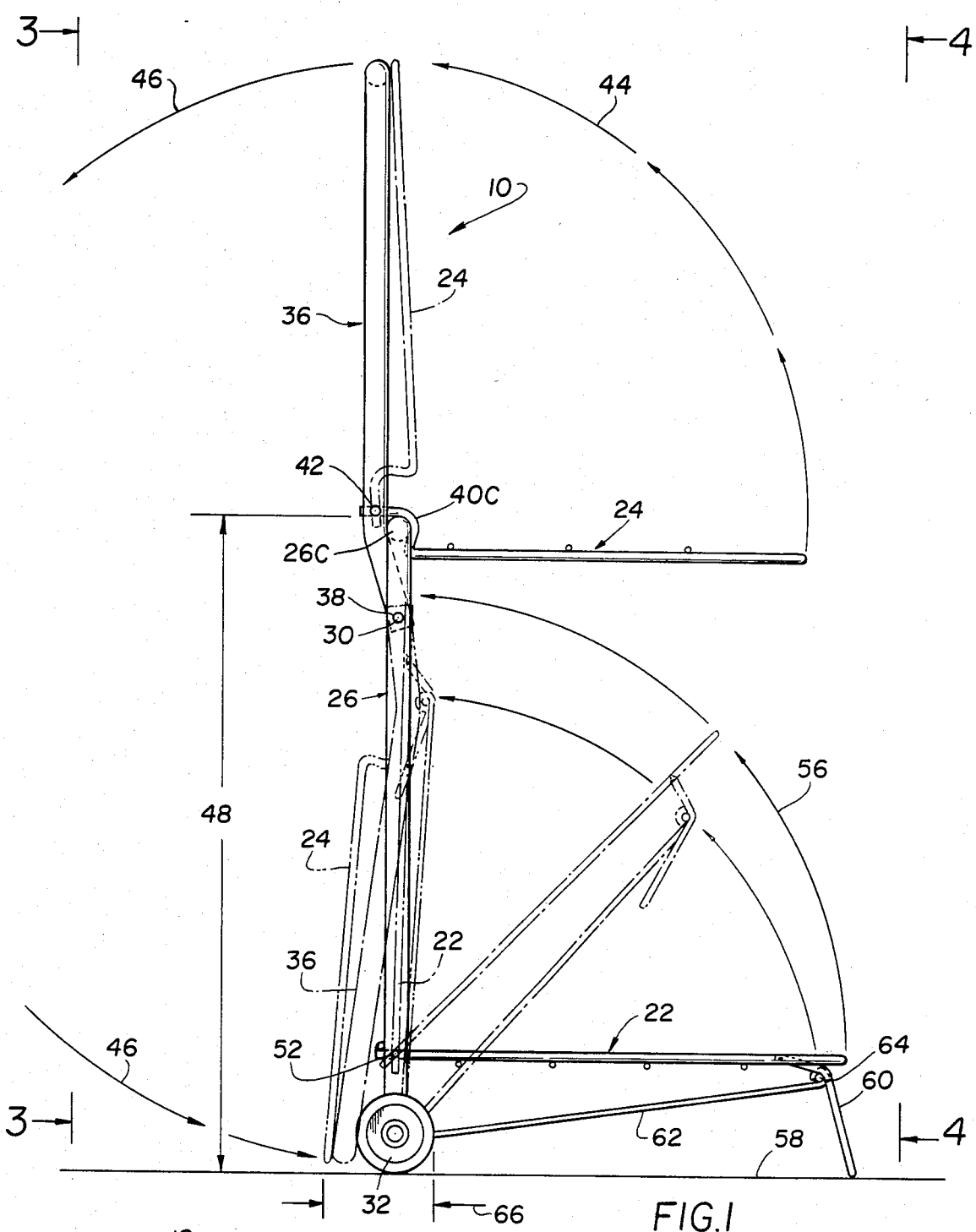
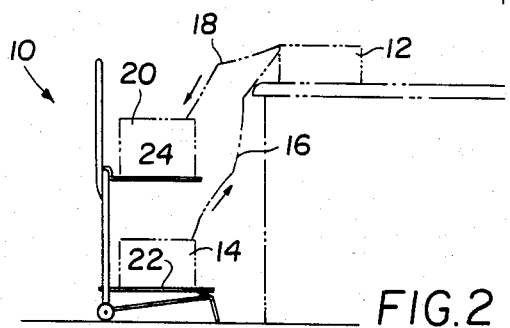
FIG.1
FIG.2

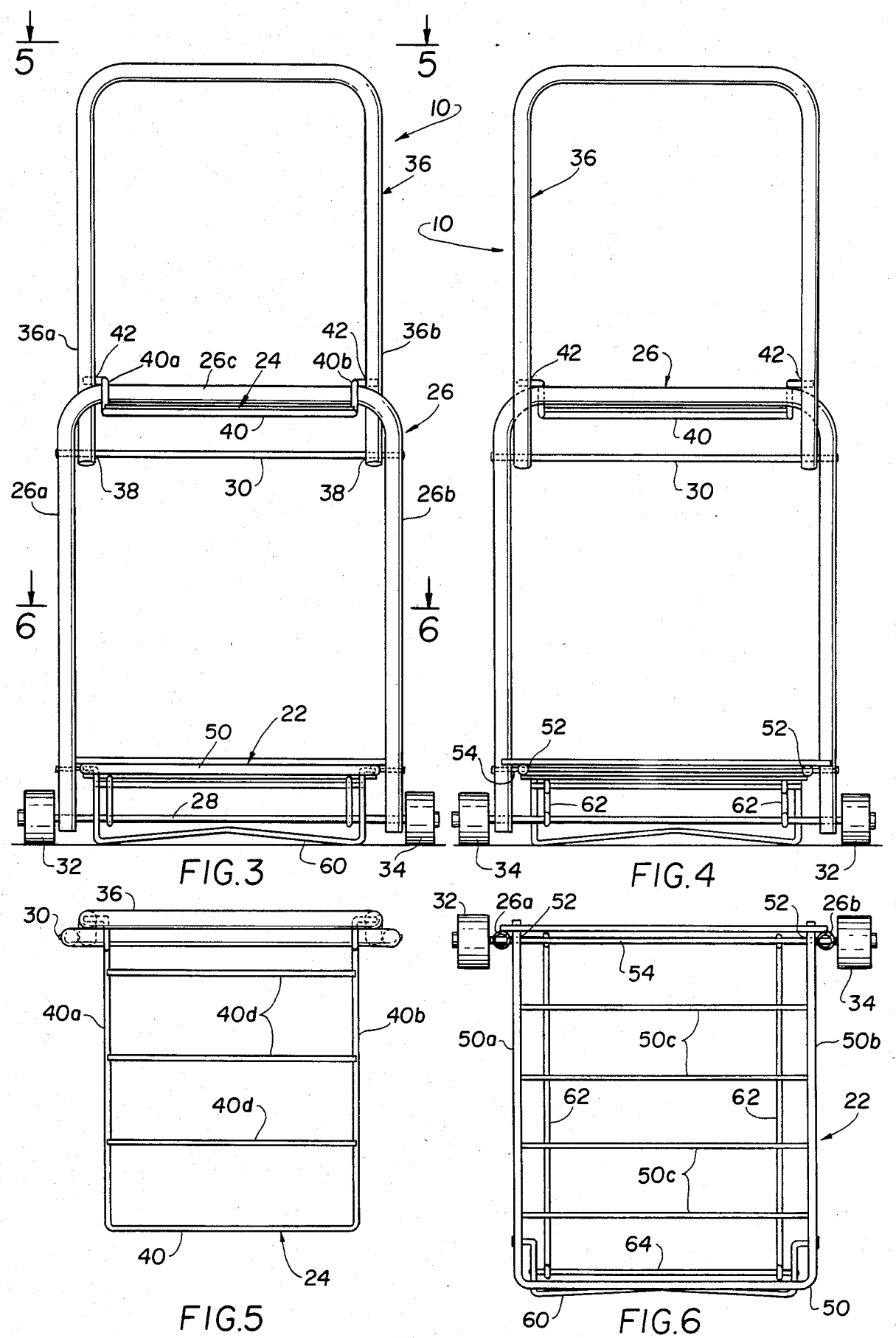

CART SUPPORT FOR A COMPUTER PRINTOUT

The present invention relates generally to an improved cart support for the blank and imprinted paper of a so-called computer printout, and more particularly to a cart having two supports thereon for said blank and processed paper, in the construction of which there is embodied a capacity to readily fold the cart into a compact storage condition when not in use.

Foldable carts of the type used for carrying luggage at airports or the like are already well known and, as exemplified by the "Collapsible Baggage Cart" of U.S. Pat. No. 4,062,565, are characterized by having a lower shelf that unfolds from a compact storage condition into a laterally extending position so as to receive thereon luggage, packages, etc. According to the present invention, the utility of these carts is significantly extended, wherein an additional supporting shelf is embodied thereon, so that the resulting two shelves can be used to support a supply length of paper when it is initially blank and when it is subsequently imprinted and constitutes a computer printout. As a two-shelf support for a computer printout, the cart effectively holds the blank paper that is fed into the computer printer and also receives thereon the imprinted result, and when not in use is readily folded into a compact storage condition, as well as embodying other noteworthy attributes and features.

Broadly, it is an object of the present invention to provide an accessory for effectively storing the paper and controlling the flow thereof during the production of a computer printout, which overcomes shortcomings in prior art accessories for this purpose. Specifically, it is an object to provide separate supports for the blank and imprinted paper in a cart-like structure that can be wheeled into position incident to use, folded into a compact storage condition when not in use, and which otherwise provides such advantages as economical cost, and a sturdy, simple construction.

A movable cart serving as a support for the blank and imprinted supply lengths of a computer printout demonstrating objects and advantages of the present invention includes a first lower inverted U-shaped frame having a pair of lower and upper axles connected in spanning relation across opposite ends thereof. A pair of wheels and journalled on the lower axle to provide mobility to the cart. Additionally, a lower first shelf is pivotally connected adjacent the lower end of the first frame and is pivotally movable from a storage position adjacent the first frame into an operative position extending laterally therefrom incident to having supported thereon the supply length of blank paper preparatory to the feeding thereof into the computer printing station. A second upper inverted U-shaped frame is pivotally connected to the upper axle so as to be pivotally movable from a storage position adjacent the first frame into an operative position forming an extention thereof, and an upper second shelf is pivotally connected adjacent the lower end of this second frame and is itself pivotally movable from a storage position adjacent the second frame into an operative position extending laterally therefrom incident to having supported thereon the imprinted paper length that exits from the printing station as a computer printout. The second shelf has a gripping means thereon that is adapted to engage in a snap fit onto the horizontally oriented leg of the first frame in its laterally extending operative position thereof, whereby said snap fit engagement holds the first and second frames in extended relation to each other and also holds the second shelf in its laterally extended operative position, such that the cart provides two shelves for separately supporting the blank and imprinted paper.

The above brief description, as well as further objects, features and advantages of the present invention, will be more fully appreciated by reference to the following detailed description of a presently preferred, but nonetheless, illustrative embodiment in accordance with the present invention, when taken in conjunction with the accompanying drawings, wherein:

FIG. 1 is a side elevational view of a foldable cart which functions, according to the present invention, as a support for a computer printout. More particularly, the illustrated cart is foldable from its position illustrated in full line into a preliminary position illustrated by the "one dot" reference line, and then into a compact storage position as illustrated by the "two dot" reference line;

FIG. 2 is a side elevational view illustrating the manner in which the cart is used as a support for blank paper and for imprinted paper during the production of a computer printout;

FIG. 3 is a rear elevational view of the cart as seen along lines 3—3 of FIG. 1;

FIG. 4 is a front elevational view of the cart as seen along lines 4—4 of FIG. 1;

FIG. 5 is a plan view as seen along lines 5—5 of FIG. 3, that has been somewhat simplified to illustrate only the upper shelf support of the cart; and FIG. 6 is similarly a plan view, as seen along lines 6—6 of FIG. 3, which illustrates details of the lower shelf of the cart.

Before describing in detail the structural features of the inventive cart, it is helpful to note that as is best illustrated in FIG. 2, that the cart, generally designated 10, is useful as an accessory for a computer printer 12 during which a supply length 14 of blank paper 16, is fed to the printer 12 and exits therefrom in imprinted condition as illustrated by reference number 18, and is stored as a computer printout 20, for subsequent study and other use. Thus, the cart 10, is required to have two supports; one for the blank paper 14, and the other for the computer printout 20. As will be subsequently explained herein in detail, the cart 10 provides the separate supports in a foldable construction which has a lower shelf 22 serving as a support for the blank paper 14, and an upper shelf 24 for the stored computer printout 20.

The structural features which form the essence of the cart 10 are perhaps best understood from FIGS. 3-6, to which reference should now be made. Cart 10 includes an inverted U-shaped lower frame 26, which has a pair of lower and upper axles 28 and 30 connected in spanning relation between its side legs 26a and 26b. A pair of wheels 32 and 34 are appropriately journaled for rotation on the opposite ends of the lower axle 28 to provide mobility to the cart 10.

Cooperating with the frame 26 to provide the body for the cart, is a second U-shaped frame 36, which adjacent the lower end of its legs 36a and 36b is pivotally mounted, as at 38, to the upper axle 30. The previously noted upper shelf 24 is, in its preferred form, a U-shaped frame 40, which has its opposite legs 40a and 40b pivotally connected as at 42, to the legs 36a, 36b, respectively of the frame 36. As is perhaps best appreciated from FIG. 1, upper shelf 24, and more particularly, the frame leg 40a and 40b thereof, have an appropriate curvature 40c, which engages in a snap fit the horizontally oriented leg 26c of the lower frame 26. At this point in the description, it is helpful to note that the engagement of the grip 40c about the leg 26c, has two significant results. First, it holds the two frames 26 and 36, which are pivotally interconnected at the pivot 30 in extended relation to each other, so that these frames 26 and 36 cooperate to serve as a vertical support for the shelves 22 and 24, as well as serve as a convenient handle for moving the cart 10 about on its wheels 32 and 34.

Second, the grip 40c is effective in holding the second or upper shelf 24 in its laterally extending operative position illustrated in full line in FIG. 1.

To release the shelf 24 from its operative position so that it can assume a compact storage condition, shelf 24 is pivotally moved through the path 44 about the pivot 42 into its position illustrated by the "single dot" reference lines, in which it is adjacent the upper frame 36. The upper frame 36 is then pivotally movable, as along the path 46 about its pivot connection 30 to the lower frame 26, and thus assumes a position adjacent the lower frame 26, as illustrated by the "double dot" reference lines in FIG. 1. In this compact storage condition of the frames 36 and 26, the cart 10 assumes an optimum nominal height 48 which is essentially that only of the lower frame 26.

The lower shelf 20 in its preferred form, is also, like upper shelf 24, a U-shaped frame 50 in which, as best illustrated in the plan view of FIG. 6, the side legs 50a and 50b are appropriately pivotally mounted, as at 52, to a horizontally oriented axle or rod 54, which is connected in spanning relation between the legs 26a and 26b of the lower frame 26. Thus, ahd again referring back to the side elevational view of FIG. 1, the lower shelf 22 is pivotally movable along the path 56 about the pivot 52 from its full line condition into its progressive folded conditions illustrated by the dot-dash reference lines in FIG. 1 until it assumes a storage condition adjacent the lower frame 26, but on the side thereof opposite to that occupied by the upper frame 36. As a result of the components assuming adjacent positions on opposite sides of the lower frame 26, the cart in its folded compact condition occupies only a nominal width 66.

To better serve its purpose as a support for the blank paper 14, shelf 22, and more particularly, frame 50 of which it is comprised, as best shown in FIG. 6, includes spaced rods 50c connected in spanning relation between the legs 50a and 50b. Also, to hold the shelf 22 in a slightly raised condition above the ground surface 58 when it is in its operative position supporting the blank paper 14, shelf 22 has a pivotally connected leg 60 at its free end. Leg 60 is actuated between its storage and operative position by a pair of connecting rods 62, connected between axle 54 and a front rod 64, which, as best shown in FIG. 6, is connected to the leg 60. The construction and operational mode of the lower shelf 22 is very similar to that of the component designated 18 in my prior U.S. Pat. No. 4,062,565 of a "Collapsible Baggage Cart", which by this reference is incorporated herein in its entirety.

To assist component 24 in properly functioning as a shelf supporting the imprinted paper which exits from the printing device 12 as a computer printout, said component 24 in addition to the frame 40 includes spaced rods 40d connected in spanning relation at spaced intervals between the side legs 40a and 40b, all as is best illustrated in the plan view of FIG. 5.

From what has been described, it should be readily appreciated that cart 10 is particularly useful in serving as a support for a computer printout, since it provides in two locations, namely, on shelf 22 and on shelf 24, stations at which supply lengths of blank paper 14 and imprinted paper 20 can be effectively supported. Also, the frames 26 and 36, which, when locked together, as at 40c, effectively provide a vertical support for the shelves 22 and 24, and also, effectively serve as a handle for pushing the cart 10 on its wheels 32 and 34 to a position adjacent the computerized printing station of printer 12. Still further, the cart 10 is readily folded into a compact storage condition when not in use, and readily unfolded therefrom into the condition illustrated in full line in FIG. 1 prepatory to being used.

A latitude of modification, change and substitution is intended in the foregoing disclosure, and in some instances some features of the invention will be employed without a corresponding use of other features. Accordingly, it is appropriate that the appended claims be construed broadly and in a manner consistant with the spirit and scope of the invention herein.

What is claimed is:

1. A movable cart serving as a support for a computer printout in the production of which a supply length of blank paper is fed into a computerized printing station and is subsequently received therefrom as printed paper providing said computer printout, said cart comprising a first lower inverted U-shaped frame having a pair of downwardly extending legs interconnected by a horizontally oriented leg and a lower axles and on upper axle connected in spanning relation between said downardly extending legs, a pair of wheels journelled on said lower axle to provide mobility to said cart, a lower first shelf pivotally connected adjacent the lower end of said first frame and being pivotally movable from a storage position adjacent said first frame into an operative position extending laterally therefrom incident to having supported thereon said supply length of blank paper preparatory to the feeding thereof into said computerized printing station, a second upper inverted U-shaped frame pivotally connected to said upper axle so as to be pivotally movable from a storage position adjacent said first frame into an operative position forming an extension thereof, and an upper second shelf pivotally connected adjacent the lower end of said second frame and being pivotally movable from a storage position adjacent said second U-shaped frame into an operative position extending laterally therefrom incident to having supported thereon said imprinted paper length exiting from said printing station as a computer printout, said second shelf having gripping means thereon consisting of curved length segments on opposite sides of said second shelf provided at selected locations therealong which are adapted to engage in a snap fit the horizontally oriented leg of said first frame in said laterally extending operative position thereof, whereby said snap fit engagement holds said first and second frames in extended relation to each other and also holds said second shelf in its laterally extended operative position, such that said cart provides two shelves for separately supporting said blank and imprinted paper.

2. A cart for a computer printout as claimed in claim 1, wherein said upper shelf is movable through a pivotal traverse from its operative extended position into a position adjacent said second frame and both said upper shelf and said second frame are pivotally movable in a continuation of said pivotal traverse adjacent one side of said first frame, and said lower shelf is pivotally movable from its operative extended position into a position adjacent the opposite side of said first frame, to thereby provide said compact storage condition for said cart.

* * * * *